(12) United States Patent
Zhang et al.

(10) Patent No.: US 10,115,182 B2
(45) Date of Patent: Oct. 30, 2018

(54) DEPTH MAP SUPER-RESOLUTION PROCESSING METHOD

(71) Applicant: Graduate School at Shenzhen, Tsinghua University, Shenzhen, Guangdong (CN)

(72) Inventors: Lei Zhang, Guangdong (CN); Xiangyang Ji, Guangdong (CN); Yangguang Li, Guangdong (CN); Yongbing Zhang, Guangdong (CN); Xin Jin, Guangdong (CN); Haoqian Wang, Guangdong (CN); Guijin Wang, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 135 days.

(21) Appl. No.: 15/216,332

(22) Filed: Jul. 21, 2016

(65) Prior Publication Data

US 2016/0328828 A1   Nov. 10, 2016

Related U.S. Application Data

(63) Continuation of application No. PCT/CN2015/072180, filed on Feb. 3, 2015.

(30) Foreign Application Priority Data

Feb. 25, 2014 (CN) .......................... 2014 1 0065631

(51) Int. Cl.
H04N 5/225 (2006.01)
H04N 13/00 (2018.01)
(Continued)

(52) U.S. Cl.
CPC ............ *G06T 3/4053* (2013.01); *G06T 11/60* (2013.01); *H04N 13/0029* (2013.01);
(Continued)

(58) Field of Classification Search
CPC ........... H04N 13/0203; H04N 13/0022; H04N 2013/0081; G06T 3/4053; G06T 11/60; G06T 7/0075; G06T 7/004
See application file for complete search history.

(56) References Cited

U.S. PATENT DOCUMENTS 8,923,622 B2 * 12/2014 O'Haire ............... G06K 9/3216
                                                       382/154
9,052,746 B2 *  6/2015 Kennett .................... G06T 7/66
(Continued)

FOREIGN PATENT DOCUMENTS

CN      101344646      1/2009
CN      102663712      9/2012
(Continued)

OTHER PUBLICATIONS

Li-Wei Liu et al., "TOF Depth Map Super-Resolution Using Compressive Sensing," 2013 Seventh International Conference on Image and Graphics, IEEE, 2013, p. 135-138.
(Continued)

*Primary Examiner* — Tsion B Owens
(74) *Attorney, Agent, or Firm* — Hamre, Schumann, Mueller & Larson, P.C.

(57) ABSTRACT

The present invention discloses a depth map super-resolution processing method, including: firstly, respectively acquiring a first original image (S1) and a second original image (S2) and a low resolution depth map (d) of the first original image (S1); secondly, 1) dividing the low resolution depth map (d) into multiple depth image blocks; 2) respectively performing the following processing on the depth
(Continued)

image blocks obtained in step 1); 21) performing super-resolution processing on a current block with multiple super-resolution processing methods, to obtain multiple high resolution depth image blocks; 22) obtaining new synthesized image blocks by using an image synthesis technology; 23) upon matching and judgment, determining an ultimate high resolution depth image block; and 3) integrating the high resolution depth image blocks of the depth image blocks into one image according to positions of the depth image blocks in the low resolution depth map (d). Through the depth map super-resolution processing method of the present invention, depth information of the obtained high resolution depth maps is more accurate.

6 Claims, 2 Drawing Sheets

(51) Int. Cl.
G06T 3/40 (2006.01)
H04N 13/128 (2018.01)
H04N 13/204 (2018.01)
G06T 11/60 (2006.01)
H04N 13/02 (2006.01)

(52) U.S. Cl.
CPC ......... *H04N 13/128* (2018.05); *H04N 13/204* (2018.05); *G06T 2207/10028* (2013.01); *G06T 2207/20021* (2013.01); *G06T 2207/20212* (2013.01); *H04N 13/0011* (2013.01); *H04N 13/0239* (2013.01); *H04N 2013/0081* (2013.01)

(56) References Cited

U.S. PATENT DOCUMENTS

| | | | |
|---|---|---|---|
| 9,417,058 B1* | 8/2016 | Lina | G01J 1/42 |
| 2012/0056982 A1* | 3/2012 | Katz | G06F 3/017 |
| | | | 348/43 |
| 2013/0127823 A1* | 5/2013 | Diverdi | G06T 15/205 |
| | | | 345/419 |
| 2013/0129224 A1 | 5/2013 | Katz et al. | |
| 2014/0177931 A1* | 6/2014 | Kocherscheidt | A61B 5/0088 |
| | | | 382/128 |

FOREIGN PATENT DOCUMENTS

| | | |
|---|---|---|
| CN | 102722863 | 10/2012 |
| CN | 102831581 | 12/2012 |
| CN | 103218776 | 7/2013 |
| CN | 103279933 | 9/2013 |
| CN | 103810685 | 5/2014 |

OTHER PUBLICATIONS

Li-Wei Liu et al., "ToF Depth Map guided Passive Stereo based on KNN searching," IEEE, 2013, 5 pages.
International Search Report for PCT/CN2015/072180, dated Apr. 24, 2015, 4 pages including English translation.

* cited by examiner

DEPTH MAP SUPER-RESOLUTION PROCESSING METHOD

BACKGROUND OF THE INVENTION

Field of the Invention

The present invention relates to the field of computer image processing, and in particular, to a depth map super-resolution processing method based on image matching Related Arts A super-resolution processing technology is one of the research hotspots in current disciplinary fields such as computer vision and image video processing, for processing natural images with low resolution and less detailed information and generating a high resolution image containing more detailed information, which is a technology that improves the original image resolution. The super-resolution processing technology has been widely used in fields such as high definition movie and television, image compression, medical imaging, video surveillance and satellite image analysis. Especially in recent 30 years, the super-resolution technology has been widely and deeply studied. A depth map contains three-dimensional depth information of an object in a scene, and plays an important role in constructing a three-dimensional visual scene. A good high resolution depth map can project a corresponding color image into a three-dimensional scene to display a clear and complete effect, which provides a powerful support for constructing an efficient and high-quality three-dimensional scene. Therefore, acquiring a high-quality high resolution depth map is of great importance in three-dimensional vision.

In the existing methods of acquiring a depth map, the depth map is acquired with a laser depth scanning method, the method can acquire a high-quality high resolution depth map, but the acquisition method has higher requirements for the equipment and technology, resulting in that the cost is high, and only one point is scanned once, the acquisition speed is slow, and it is difficult to meet a real-time requirement. Also, a scene is directly shot and acquired through a depth camera, for example, a time-of-flight (TOF) camera or the like, to rapidly obtain a depth image in real time; however, the method can only obtain a low resolution depth map, and further processing is required for obtaining a high resolution depth map. In the existing processing methods, super-resolution processing is directly performed on the depth map with a super-resolution method, but the quality of the high resolution depth map in actual scene rendering cannot be obtained after processing, which is of little practical importance.

SUMMARY OF THE INVENTION

The technical problem to be solved in the present invention is to provide a depth map super-resolution processing method with which depth information of a high resolution depth map processed is more accurate, so as to make up for the shortcomings of the prior art.

The technical problem of the present invention is solved through the following technical solution:

A depth map super-resolution processing method, including: firstly, performing image acquisition on the same scene in a first position and a second position, and respectively acquiring a first original image (S1) and a second original image (S2); acquiring a low resolution depth map (d) of the first original image (S1); secondly, performing the following processing: 1) dividing the low resolution depth map (d) into multiple depth image blocks; 2) respectively performing the following processing on the depth image blocks obtained in step 1); 21) performing super-resolution processing on a current block with multiple super-resolution processing methods, to obtain multiple initial high resolution depth image blocks having the resolution the same as that of the first original image (S1); 22) traversing the multiple high resolution depth image blocks obtained in step 21), respectively combining corresponding image blocks in the first original image (S1) which correspond to the current block, and synthesizing multiple image blocks corresponding to the second original image (S2) by using an image synthesis technology according to a relative position relationship between the first position and the second position, which are defined as multiple synthesized image blocks; 23) traversing the multiple synthesized image blocks obtained in step 22), respectively calculating a matching degree between each synthesized image block and a corresponding block in the second original image (S2) which corresponds to the current block, determining the synthesized image block with the highest matching degree, and determining a high resolution depth image block corresponding to the synthesized image block with the highest matching degree as an ultimate high resolution depth image block of the current block; and 3) integrating the high resolution depth image blocks of the depth image blocks into one image according to positions of the depth image blocks in the low resolution depth map (d), to obtain a super-resolution processing map of the low resolution depth map (d).

Compared with the prior art, the present invention has the following beneficial effects:

The depth map super-resolution processing method of the present invention uses multiple existing super-resolution methods to respectively perform super-resolution processing on each block of a depth map, generates synthesized image blocks corresponding to a second original image according to generated high resolution depth map results and by respectively combining corresponding first original image blocks, matches the generated synthesized image blocks with the known second original image block, and obtains a high resolution depth image block to be found through the synthesized image block with the highest matching degree. In the method, a high resolution depth map is determined based on a matching degree between a synthesized image and an actual image, and the determined high resolution depth map more matches and is closer to the actual situation, that is, depth information of the high resolution depth map is more accurate, so that the processed high resolution depth map is of more practical significance and use value.

DETAILED DESCRIPTION OF THE INVENTION

The present invention is described in further detail below with reference to embodiments and the accompanying drawings.

The present invention is conceived as follows: by study on a super-resolution technology and a Depth-Image-Based- Rendering (DIBR) technology, the quality of a high resolution depth map restored by the super-resolution technology is reversely verified by using a matching result of a synthesized image blocks and an original image block. In the specific embodiment, block processing is first performed on an image, a depth image block is restored to a resolution level the same as that the corresponding color image through multiple existing super-resolution technologies and then is projected to a three-dimensional space by using the restored depth image block and the corresponding image block information, then new synthesized image blocks are obtained through a virtual camera and a three-dimensional scene, the synthesized image blocks are matched with a collected initial image, and a desired high resolution depth image block corresponding thereto is found through the synthesized image block with the best matching effect. Each block in the low resolution depth map is processed as above, a high resolution depth image block of each block is obtained, and finally, the high resolution depth image blocks are integrated to obtain a high resolution depth map after super-resolution processing.

Figure 1:
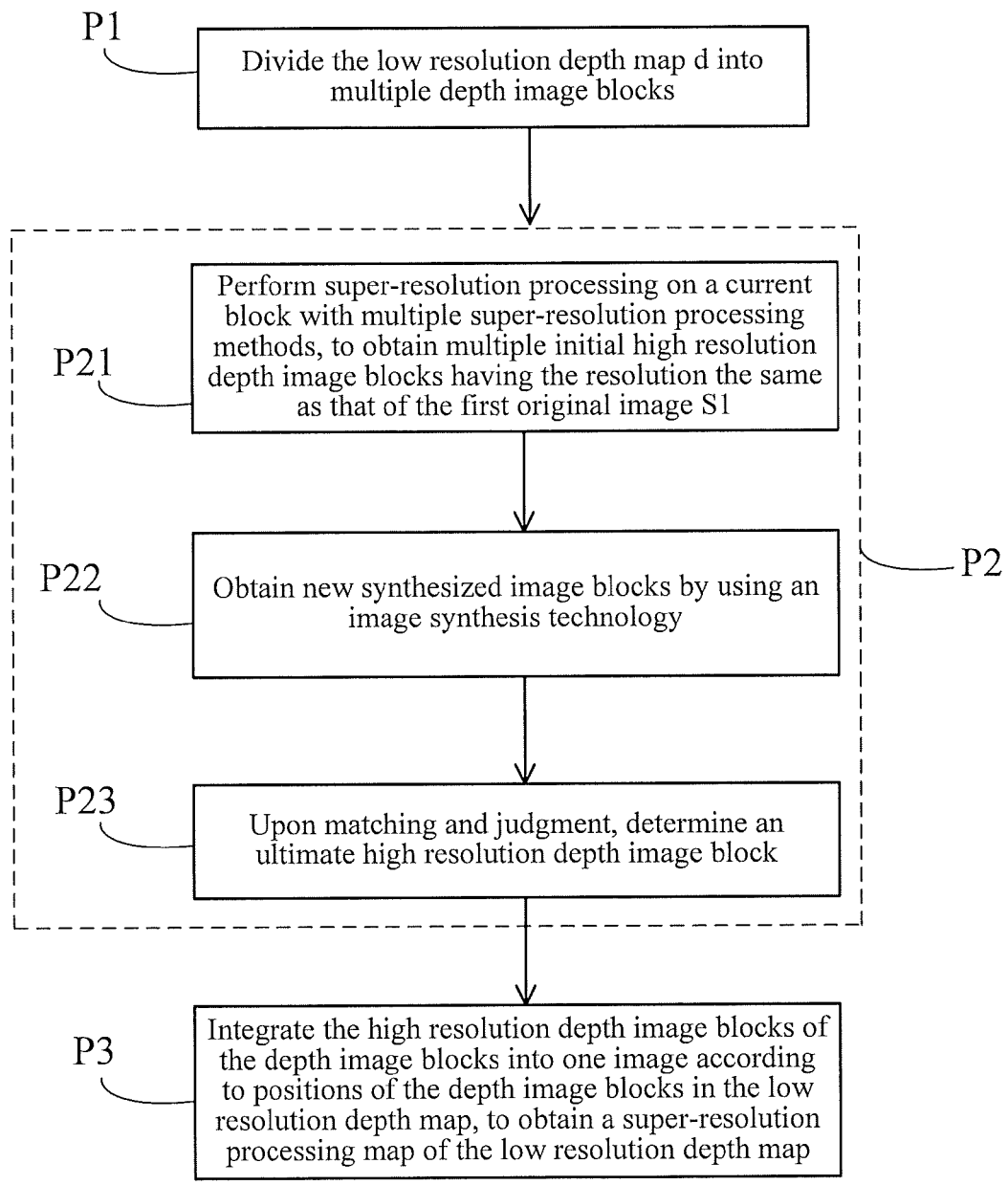
FIG. 1 is a flow chart of a depth map super-resolution processing method according to a specific embodiment of the present invention.

In the specific embodiment, a depth map super-resolution processing method is provided, and super-resolution processing is performed on a low resolution depth map of a first original image S1. Respectively in two different positions, image acquisition is performed on the same scene in a first position and a second position, that is, a first original image S1 and a second original image S2 are acquired respectively, and then a low resolution depth map d of the first original image S1 is acquired. When the low resolution depth map d is acquired, a depth camera, for example (but not limited to), a time-of-flight (TOF) camera, can be used, image acquisition is performed on the scene in the first position, and the low resolution depth map d of the first original image S1 is directly acquired. After the processed object is obtained, the process proceeds to the processing steps as shown in FIG. 1:

P1) The low resolution depth map d is divided into multiple depth image blocks. In this step, considering that different regions of the depth map have different features (such as gradient condition), the super-resolution method most suitable for each region may also vary, and thus block processing is performed on the depth map, to respectively find a super-resolution processing method most suitable for each block. A block processing method has many implementation manners, which are all applicable to this specific embodiment and are not specifically described herein.

P2) The following processing is performed on the depth image blocks:

P21) super-resolution processing is performed on a current block with multiple super-resolution processing methods, to obtain multiple initial high resolution depth image blocks having the resolution the same as that of the first original image S1.

In this step, the multiple existing super-resolution processing methods include bi-cubic interpolation, new edge direction interpolation, a K neighborhood embedding method, a sparse presentation method and the like, and the processing methods have their characteristics and all can be applied to this. For example, super-resolution processing is performed on a current depth image block respectively with r existing super-resolution methods, which is processed into a high resolution image with the resolution the same as that of the first original image S1, to obtain r corresponding high resolution depth image blocks. The obtained multiple high resolution depth image blocks are defined as a set ID, and $\Delta D$ is set as any one high resolution depth image block therein.

P22) New synthesized image blocks are obtained by using an image synthesis technology, which is specifically: traversing the set ID, respectively combining corresponding image blocks in the first original image S1 which correspond to the current block, and synthesizing multiple image blocks corresponding to the second original image S2 by using an image synthesis technology according to a relative position relationship between the first position and the second position, which are defined as multiple synthesized image blocks and set as a set IS.

In this step, when the image synthesis technology is adopted, the corresponding image blocks are first projected into a three-dimensional space, and then new image blocks are generated based on a three-dimensional scene. The step specifically includes the following steps: a) projecting the corresponding image blocks in the first original image (S1) into a three-dimensional space by using a reference camera with a depth-image-based-rendering method, that is, DIBR method, according to depth information of the high resolution depth image blocks; and b) setting the center of a virtual camera by making the center of the reference camera correspond to the first position and according to the relative position relationship of the second position relative to the first position, and imaging a scene of the three-dimensional space obtained in step a) into a two-dimensional plane by using the virtual camera, so as to obtain a synthesized image block. In a process of restoring the two-dimensional plane, relative positions of the reference camera and the virtual camera are set according to the relative position relationship between the second position and the first position. The second position corresponds to the second original image, and thus the synthesized image block is an image block corresponding to the second original image.

Figure 2:
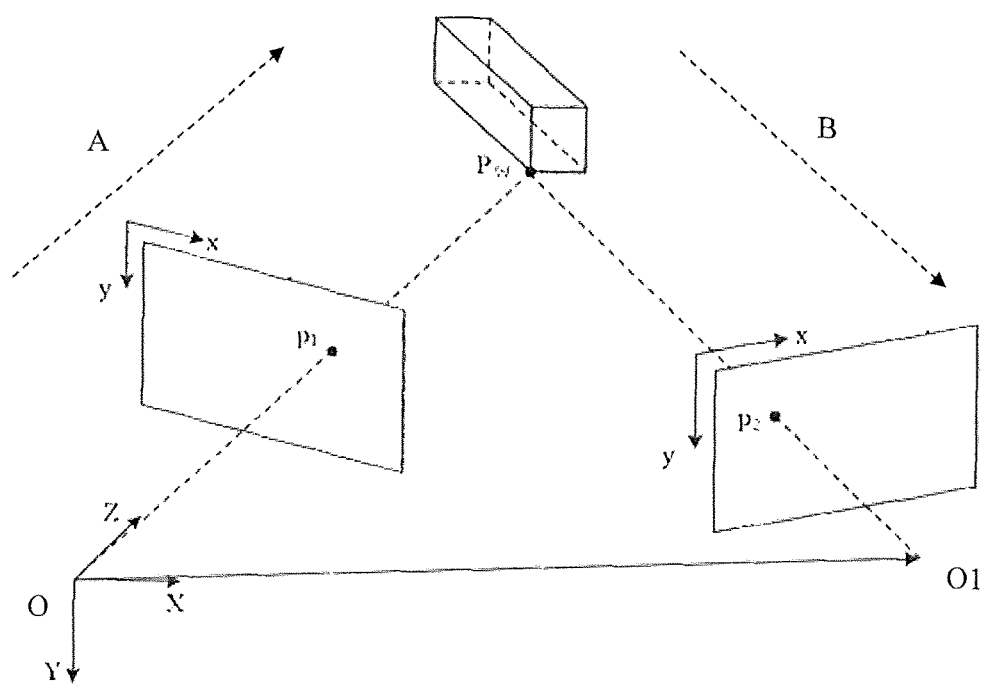
FIG. 2 is a schematic diagram of the principle of projection and restored imaging in a depth map super-resolution processing method according to a specific embodiment of the present invention.

As shown in FIG. 2, it is a schematic diagram of the principle of projection and restored imaging during image synthesis. The center of the reference camera is located at the point O, the virtual camera is located at the point O1, and the relative position relationship of the point O1 relative to the point O is equivalent to the relative position relationship of the second position relative to the first position. As shown by the arrow A, it is a schematic diagram of projection into a three-dimensional space; the reference camera projects a pixel point $p_1$ in an image block of the first original image S1 into a three-dimensional space, which corresponds to Pw. As shown by the arrow B, it is a schematic diagram of restoration and imaging into a two-dimensional plane; the virtual camera restores the point Pw in the three-dimensional space into the two-dimensional plane, which corresponds to the pixel point $p_2$.

In this embodiment, specifically, when projection is conducted in step a), the corresponding image block is projected into the three-dimensional space according to the following equation:

$$(X_W, Y_W, Z_W)^T = K_1^{-1} d_1 p_1$$

wherein the center of the reference camera is the center of the world coordinate system, that is, the coordinate of the center of the reference camera is $(0,0,0)^T$, and a direction observed from the reference camera is a z-axis direction of the coordinate system. $p_1$ indicates position information of a pixel point $p_1$ in the corresponding image block in the first original image S1, in a homogeneous form, that is, the value of the third dimension is 1. For example, the position of the pixel point $p_1$ in the first original image S1 is (x1, y1), and pi in the equation is (x1, y1, 1). $d_1$ is depth information of a corresponding pixel point $p_1$ in the high resolution depth image block, $K_1$ is a built-in parameter matrix of the reference camera, and $(X_W, Y_W, Z_W)$ is a coordinate of a point in the three-dimensional space into which the pixel point $p_1$ is projected, which, as shown in FIG. 2, is the coordinate of the point Pw in the three-dimensional scene. Certainly, there are many specific manners in the DIBR method to achieve projection from a two-dimensional image to a three-dimensional scene, the above equation is merely one of those listed, and other projection manners are also applicable to step a).

Specifically, when the scene of the three-dimensional space is imaged to the two-dimensional plane in step b), the scene of the three-dimensional space is imaged to the two-dimensional plane according to the following equation:

$$d_2 p_2 = K_2 R_2 P_W - K_2 R_2 C_2$$

wherein the center of the reference camera is the center of the world coordinate system, that is, the coordinate of the center of the reference camera is $(0,0,0)^T$, and a direction observed from the reference camera is a z-axis direction of the coordinate system. $C_2$ is a coordinate of the center of the virtual camera, $R_2$ is a rotation matrix of the virtual camera, $K_2$ is a built-in parameter matrix of the virtual camera, $P_W$ is a coordinate of a point in the three-dimensional space obtained in step a), $p_2$ and $d_2$ are position and depth information of the corresponding pixel point in the synthesized image block obtained through imaging to the two-dimensional plane; an operation result on the right of the equation is converted to a homogeneous form: m(x, y, 1), $p_2$ is (x, y), and $d_2$ is the coefficient m. In the above equation, acquisition of the relative position relationship of the second position of the second original image S2 relative to the first position affects specific values of the parameters $C_2$ and $R_2$, and an image block finally restored and imaged corresponds to the second original image S2. Similarly, there are many implementation manners of restoring a two-dimensional image from a three-dimensional scene, the above equation is merely one of those listed, and other restoration manners are also applicable to step b).

Through the image synthesis in step P22), corresponding new synthesized image blocks are synthesized for the high resolution image blocks, which form a set IS.

P23) Upon matching and judgment, an ultimate high resolution depth image block is determined, which is specifically: traversing the set IS, respectively calculating a matching degree between each synthesized image block and a corresponding block in the second original image S2 which corresponds to the current block, determining the synthesized image block with the highest matching degree, and determining a high resolution depth image block corresponding to the synthesized image block with the highest matching degree as an ultimate high resolution depth image block of the current block.

In this step, which high resolution depth image block in the multiple high resolution depth image blocks obtained in step P1) is a super-resolution processing result closest to the actual situation is judged based on the matching results between the new synthesized image blocks and the original image block. The synthesized image block ΔS most matches the original image block, and the high resolution depth image block corresponding to the synthesized image block ΔS is the super-resolution processing result closest to the actual situation, so as to determine a high resolution depth image block after super-resolution processing closest to the actual situation. The method of calculating an image matching degree may be (but not limited to) the Minimum Mean Square Error matching method.

Through step P22) and step P23), the first original image S1 is projected into the three-dimensional space through the generated depth image information with the same resolution by using the DIBR method, then new synthesized image blocks are obtained by using the three-dimensional scene to be matched with the acquired second original image, and the matching result is used as prior knowledge for the depth map super-resolution, so as to obtain a high resolution depth image which is reasonable and valuable.

P3) The high resolution depth image blocks of the depth image blocks are integrated into one image according to positions of the depth image blocks in the low resolution depth map d, to obtain a super-resolution processing map of the low resolution depth map d.

In this step, the high resolution depth image blocks obtained in step P2) are integrated into a complete image, to obtain a high resolution depth map of the low resolution depth map d. Preferably, after the integrating, the method further includes smoothing the complete high resolution depth image. The smoothing is performed mainly in consideration of an image overlapping region. In case of smoothing, it is feasible to use (but not limited to) a common mean method.

According to the depth map super-resolution processing method in the specific embodiment, through the above steps, a processing result, i.e., a high resolution depth map, is finally obtained. In the method, basing on the matching result between the new synthesized image block and the original image block is the precondition of positively correlating with the matching result between the high resolution depth map obtained through processing and the high resolution depth map of the actual situation, so as to determine which image block in the multiple high resolution depth image blocks obtained with multiple super-resolution processing methods is most accurate and closest to the actual situation. That is, with the processing method in the specific embodiment, relative to the existing method of direct super-resolution processing on a low resolution depth map, the high resolution depth map obtained is much closer to the actual situation, depth information of the high resolution depth map is more accurate, is of more practical significance and valuable. In addition, processing each block in the low resolution depth map respectively by using advantages and characteristics of different super-resolution methods fully ensures that depth image blocks having different features can obtain super-resolution processing methods most suitable for their image characteristics, and makes sure that multiple processing results include a processing result closest to the actual situation. The processing method in the specific embodiment gives full play to characteristics and advantages of multiple super-resolution methods, well fuses advantages of the existing super-resolution methods into super-resolution processing of the depth image, and can restore a high resolution depth map which is of practical significance and valuable.

The above contents are further detailed descriptions about the present invention in combination with specific preferred embodiments, but it cannot be concluded that specific implementation of the present invention is merely limited to the descriptions. For those of ordinary skill in the art, several alternative or evident transformations made without departing from the concept of the present invention and having the same performance or use shall fall within the protection scope of the present invention.

What is claimed is:

1. A depth map super-resolution processing method, comprising:

firstly, performing image acquisition on the same scene in a first position and a second position, and respectively acquiring a first original image and a second original image; acquiring a low resolution depth map of the first original image;

secondly, performing the following processing:
1) dividing the low resolution depth map into multiple depth image blocks;
2) respectively performing the following processing on the depth image blocks obtained in step 1);
    21) performing super-resolution processing on a current block with multiple super-resolution processing methods, to obtain multiple initial high resolution depth image blocks having the resolution the same as that of the first original image;
    22) traversing the multiple initial high resolution depth image blocks obtained in step 21), respectively combining corresponding image blocks in the first original image which correspond to the current block, and synthesizing multiple image blocks corresponding to the second original image by using an image synthesis technology according to a relative position relationship between the first position and the second position, which are defined as multiple synthesized image blocks;
    23) traversing the multiple synthesized image blocks obtained in step 22), respectively calculating a matching degree between each synthesized image block and a corresponding block in the second original image which corresponds to the current block, determining the synthesized image block with the highest matching degree, and determining a high resolution depth image block corresponding to the synthesized image block with the highest matching degree as an ultimate high resolution depth image block of the current block; and
3) integrating the high resolution depth image blocks of the depth image blocks into one image according to positions of the depth image blocks in the low resolution depth map, to obtain a super-resolution processing map of the low resolution depth map.

2. The depth map super-resolution processing method according to claim 1, wherein, when the image synthesis technology is adopted, step 22) comprises the following steps: a) projecting the corresponding image blocks in the first original image into a three-dimensional space by using a reference camera with a depth-image-based-rendering method according to depth information of the high resolution depth image blocks; and b) setting the center of a virtual camera by making the center of the reference camera correspond to the first position and according to the relative position relationship of the second position relative to the first position, and imaging a scene of the three-dimensional space obtained in step a) into a two-dimensional plane by using the virtual camera, so as to obtain a synthesized image block.

3. The depth map super-resolution processing method according to claim 2, wherein, when projection is conducted in step a), the corresponding image block is projected into the three-dimensional space according to the following equation:

$$(X_w, Y_w, Z_w)^T = K_1^{-1} d_1 p_1$$

wherein the center of the reference camera is the center of the world coordinate system, and a direction observed from the reference camera is a z-axis direction of the coordinate system; $p_1$ indicates position information of a pixel point $p_1$ in the corresponding image block in the first original image, in a homogeneous form; $d_1$ is depth information of a corresponding pixel point $p_1$ in the high resolution depth image block, $K_1$ is a built-in parameter matrix of the reference camera, and $(X_w, Y_w, Z_w)$ is a coordinate of a point in the three-dimensional space into which the pixel point $p_1$ is projected.

4. The depth map super-resolution processing method according to claim 2, wherein, when the scene of the three-dimensional space is imaged to the two-dimensional plane in step b), the scene of the three-dimensional space is imaged to the twodimensional plane according to the following equation:

$$d_2 p_2 = K_2 R_2 P_w - K_2 R_2 C_2$$

wherein the center of the reference camera is the center of the world coordinate system, and a direction observed from the reference camera is a z-axis direction of the coordinate system; $C_2$ is a coordinate of the center of the virtual camera, $R_2$ is a rotation matrix of the virtual camera, $K_2$ is a built-in parameter matrix of the virtual camera, $P_w$ is a coordinate of a point in the three-dimensional space obtained in step a), $p_2$ and $d_2$ are position and depth information of the corresponding pixel point in the synthesized image block obtained through imaging to the two-dimensional plane; an operation result on the right of the equation is converted to a homogeneous form: m(x, y, 1), $p_2$ is (x, y), and $d_2$ is the coefficient m.

5. The depth map super-resolution processing method according to claim 1, wherein, after the high resolution depth image blocks are integrated into one image, step 3) further comprises smoothing the image.

6. The depth map super-resolution processing method according to claim 1, wherein, when the low resolution depth map is acquired, image acquisition is performed on the scene in the first position by using a depth camera, so as to acquire the low resolution depth map.

* * * * *